United States Patent
Bowman et al.

[11] Patent Number: 6,069,799
[45] Date of Patent: May 30, 2000

[54] SELF-SYNCHRONIZED DRIVE CIRCUIT FOR A SYNCHRONOUS RECTIFIER IN A CLAMPED-MODE POWER CONVERTER

[75] Inventors: Wayne C. Bowman, Allen; Van A. Niemela, Dallas; Allen F. Rozman, Richardson, all of Tex.

[73] Assignee: Lucent Technologies Inc., Murray Hill, N.J.

[21] Appl. No.: 09/072,370

[22] Filed: May 4, 1998

Related U.S. Application Data

[60] Provisional application No. 60/046,427, May 14, 1997.
[51] Int. Cl.⁷ .......................... H02M 3/335; H02M 3/00
[52] U.S. Cl. .............................................. 363/20; 363/15
[58] Field of Search .................................. 363/20, 21, 15, 363/16, 17, 18, 127, 131

[56] References Cited

U.S. PATENT DOCUMENTS

| | | | |
|---|---|---|---|
| 5,274,543 | 12/1993 | Loftus, Jr. | 363/127 |
| 5,291,382 | 3/1994 | Cohen | 363/16 |
| 5,303,138 | 4/1994 | Rozman | 363/21 |
| 5,590,032 | 12/1996 | Bowman et al. | 363/15 |

OTHER PUBLICATIONS

Article entitled: "Design of a High–Efficiency Power Converter for a Satellite Solid–State Power Amplifer;" L. Huber, D. Sable, G. Hua, and F.C. Lee; Virginia Power Electronics Center, the Bradley Department of Electrical Engineering, Virginia Polytechnic Institute and State University, Blacksburg, VA 24061–0111 May 1994.

*Primary Examiner*—Edward H. Tso
*Assistant Examiner*—Rajnikant B. Patel

[57] ABSTRACT

A power converter having an input and output and a method of operating the power converter. In one embodiment, the power converter includes a power transformer having primary and secondary windings and a power switch coupled to the input and configured to impress an input voltage across the primary winding. The power converter further includes a hybridge synchronous rectifier coupled to the secondary winding and including first and second synchronous rectifier switches. The power converter still further includes a separate drive winding wound on the power transformer and coupled between the first and second synchronous rectifier switches. The separate drive winding is configured to alternately energize the first and second synchronous rectifier switches.

40 Claims, 8 Drawing Sheets

SELF-SYNCHRONIZED DRIVE CIRCUIT FOR A SYNCHRONOUS RECTIFIER IN A CLAMPED-MODE POWER CONVERTER

CROSS REFERENCE TO PROVISIONAL APPLICATION

This application claims the benefit of U.S. Provisional Application Ser. No. 60/046,427, filed on May 14, 1997, and entitled "Self-Synchronized Drive Circuit for a Synchronous Rectifier in a Clamped-Mode Power Converter," commonly assigned with the present invention and incorporated herein by reference.

CROSS-REFERENCE TO RELATED APPLICATION

This application is related to U.S. Pat. No. 5,590,032, entitled "Self-Synchronized Drive Circuit for a Synchronous Rectifier in a Clamped-Mode Power Converter," to Bowman, et al., commonly assigned with the present invention and incorporated herein by reference.

TECHNICAL FIELD OF THE INVENTION

The present invention is directed, in general, to power conversion and, more specifically, to a self-synchronized drive circuit for a synchronous rectifier in a power converter and a power converter employing the same.

BACKGROUND OF THE INVENTION

A converter is a power processing circuit that may have an input-output isolation transformer and that operates to convert an input voltage waveform with a DC component into an output DC voltage waveform. The presence of an isolation transformer requires the use of a rectifier circuit in the converter output circuit to perform the waveform conversion. The traditional rectifier uses rectifying diodes that conduct the load current only when forward biased in response to the input waveform. In some rectifiers (i.e., synchronous rectifiers) the diodes are replaced by controllable switches that are periodically biased into conduction and nonconduction in synchronism with the periodic waveform to be rectified. In self-synchronized synchronous rectifiers, the biasing of the synchronous switches is supplied directly from the transformer to activate the synchronous switches.

Self-synchronized synchronous rectifiers come in many forms to meet the specified operating constraints. The challenge, in each instance, is to devise synchronous rectifier circuitry that is efficient (i.e., has low power dissipation) in performing the rectification process. The specific circuit topology of the synchronous rectifier is dependent in large part on the converter type being used and its operating characteristics (e.g., hard switched verses soft switched converter). Application of self-synchronized synchronous rectifiers to hard switched buck derived converter topologies, for example, is limited by a variable transformer reset voltage that often causes the voltage across the transformer windings to be essentially zero during a portion of each switching cycle. During this time, the synchronous rectifier switch that should be conducting is operating in a dissipative or cut-off mode causing a serious shortfall in efficiency.

An example of a circuit that eliminates the problem of zero voltage across the transformer is provided in the U.S. Pat. No. 5,303,138, entitled "Low Loss Synchronous Rectifier for Application to Clamped-Mode Power Converters," to Allen F. Rozman, commonly assigned with the present invention and incorporated herein by reference. Rozman discloses an improved forward converter combined with a self synchronized synchronous rectifier. In a circuit disclosed by Rozman, the reset voltage is clamped and maintained over the non conducting interval of the main power switch and hence causes the rectifier to operate over the entire non conducting interval. In this arrangement, the gate drive signal is directly dependent upon the voltage of the secondary winding which in turn is dependent upon the input voltage and load. In practice, the voltages of the secondary winding may vary over a substantial range and there is the possibility of insufficient drive voltage for a rectifier that is conducting, causing it to operate in either a dissipative mode or a cut-off mode. This deficiency is quite likely for converters that deliver low output voltages.

In a circuit disclosed by L. Hubler, et. al, entitled "Design of a High Efficiency Power Converter for a Satellite Solid-State Power Amplifier," APEC 1994 page 645, which is incorporated herein by reference, the problem of insufficient drive voltage is overcome by including separate windings on the power transformer to drive the synchronous rectifier switches. However, when the turns of the drive windings are set high enough to ensure adequate drive voltage for all operating conditions of input voltage and load, excessive drive voltage is typically generated at some operating condition. This causes excessive power dissipation or failure of the synchronous rectifier switch.

In another U.S. Pat. No. 5,274,543, entitled "Zero-Voltage Switching Power Converter with Lossless Synchronous Rectifier Gate Drive," to Thomas P. Loftus, Jr., commonly assigned with the present invention and incorporated herein by reference. Loftus discloses voltage limiting (gate drive) switches as a means for limiting dissipation in the drive circuit for the synchronous rectifiers.

Accordingly, what is needed in the art is a drive circuit for a synchronous rectifier that improves on the teachings proposed in the prior art.

SUMMARY OF THE INVENTION

To address the above-discussed deficiencies of the prior art, the present invention provides a power converter having an input and output and a method of operating the power converter.

In one embodiment, the power converter includes a power transformer having primary and secondary windings and a power switch coupled to the input and configured to impress an input voltage across the primary winding. The power converter further includes a hybridge synchronous rectifier coupled to the secondary winding and including first and second synchronous rectifier switches. The power converter still further includes a separate drive winding wound on the power transformer and coupled between the first and second synchronous rectifier switches. The separate drive winding is configured to alternately energize the first and second synchronous rectifier switches.

In another aspect, the present invention provides a power converter having an input and output. In one embodiment of this aspect of the present invention, the power converter includes a first and second power transformer each having primary and secondary windings and a power switch, coupled to the input, that impresses an input voltage across the primary windings. The power converter further includes a synchronous rectifier coupled to the secondary windings and including first and second synchronous rectifier switches. The power converter still further includes first and second separate drive windings wound on the first and second power transformers, respectively, and coupled to the first and second synchronous rectifier switches, respectively. The first and second separate drive windings are configured to alternately energize the first and second synchronous rectifier switches, respectively.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
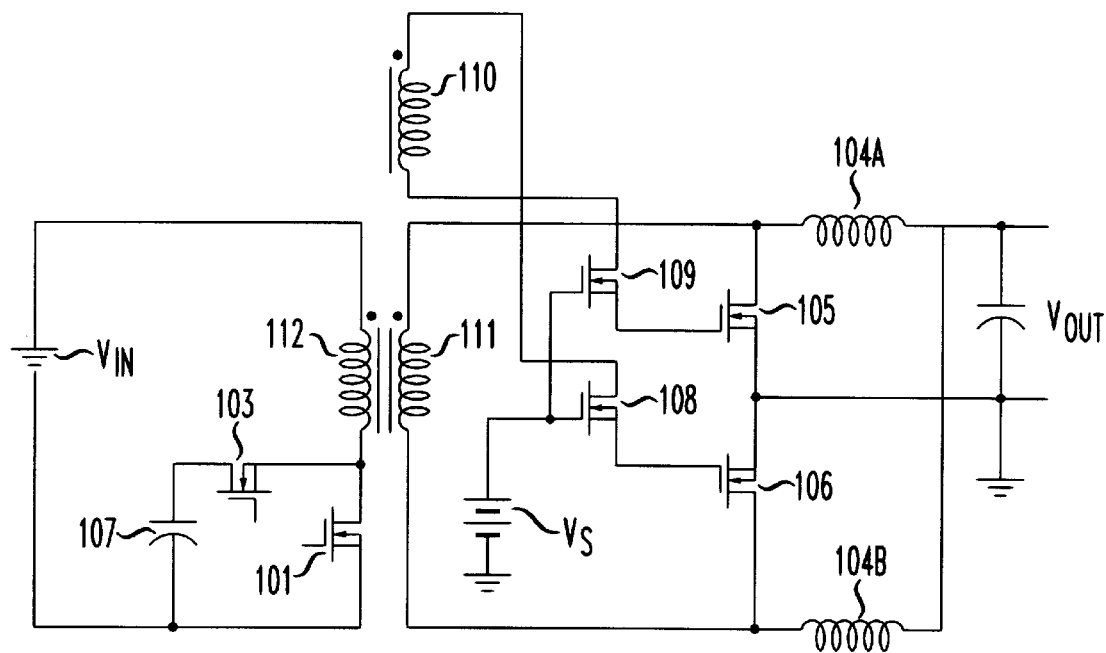
FIG. 1 illustrates a schematic diagram of an embodiment of a power converter with a self-synchronized synchronous rectifier constructed according to the principles of the present invention.

Referring initially to FIG. 1, illustrated is a schematic diagram of an embodiment of a power converter (e.g., a DC-to-DC converter) with a self-synchronized synchronous rectifier constructed according to the principles of the present invention. The converter includes a main power switch 101 coupled to and periodically switched to enable an input DC voltage Vin to be applied to a primary winding 112 of a power transformer. An auxiliary switch 103 and a capacitor 107 coupled in series and placed in shunt connection with the power switch 101 operates to clamp the voltage level across the windings of the transformer during non-conducting intervals of the power switch 101. This ensures that a voltage exists at the windings of the power transformer over the entire time of non-conduction of the main power switch 101 to assure drive for synchronous rectifier switches connected in the secondary circuit.

A secondary winding 111 is coupled to first and second synchronous rectifier switches [e.g., field-effect-transistors (FETs)] 105, 106, which are configured in a hybridge configuration and controllably switched to rectify a periodic waveform supplied to the first and second synchronous rectifier switches 105, 106 by the secondary winding 111. Although the first and second synchronous rectifier switches 105, 106 are FETs in the illustrated embodiment, it should be apparent to those skilled in the art that other switching devices, such as bipolar junction transistors (BJTs), gallium arsenide field-effect transistors (GaAsFETs) and diodes, may also be used for the rectifier switches. A low pass filter including first and second inductors 104a, 104b act on the rectified waveform to supply the output voltage Vout.

The power transformer also includes a third or drive winding 110 having a winding polarity so that its voltage is utilized to appropriately drive the first and second synchronous rectifier switches 105, 106. Drive signals to the first and second synchronous rectifier switches 105, 106 are applied through drain-source paths of first and second voltage limit switches 109, 108, respectively. The drive signal level is determined by the turns ratio of the drive winding 110 with respect to the primary winding 112, selected to assure that there is a sufficient drive signal for the gates of the first and second synchronous rectifier switches 105, 106 over the entire operating cycle and permitted range of input voltage Vin. The first and second voltage limit switches 109, 108 limit the voltage applied to the gates of the first and second synchronous rectifier switches 105, 106 to reduce dissipative losses and to reduce the possibility of voltage overstress on the first and second synchronous rectifier switches 105, 106. In the illustrated embodiment, a voltage source Vs is also shown and is used to provide a bias voltage to the first and second voltage limit switches 109, 108.

The operation of the converter will hereinafter be described in detail. In this discussion, a cycle begins when the power switch 101 is closed, i.e., conducting. At the start of the "on" time, the power switch 101 is closed and the dotted terminal of all the windings are positive. Current flows into the dotted terminal of the primary winding 112 and out of the dotted terminal of the secondary winding 111. The gate of the second synchronous rectifier switch 106 is at a positive potential with respect to secondary ground and the channel of the second synchronous rectifier switch 106 is conducting. The channel of the second voltage limit switch 108 is non-conducting, limiting the peak voltage across the gate of the second synchronous rectifier switch 106. The gate of the first synchronous rectifier switch 105 is negative with respect to secondary ground and the channel of the first synchronous rectifier switch 105 is non-conducting.

The "on" portion of the cycle ends when the power switch 101 opens and, after a short dead time, the auxiliary switch 103 closes. During this transition the following occurs: (a) the polarity of all the windings are reversed, making the dotted terminal of all the windings negative, (b) as the dotted terminal of the drive winding 110 becomes negative, the body diode of the n-channel FET, i.e., the second voltage limit switch 108, is forward biased and begins to conduct, removing charge from the gate of the second synchronous rectifier switch 106 and turning the channel of the second synchronous rectifier switch 106 off and (c) current flows into the gate of the first synchronous rectifier switch 105 through the channel of the first voltage limit switch 109 until the channel of the first synchronous rectifier switch 105 is made conducting. Charge continues to flow through the channel of first voltage limit switch 109 until the voltage at the gate of the first synchronous rectifier switch 105 (which is also the source of the first voltage limit switch 109) is sufficiently positive with respect to the voltage source Vs to turn the channel of the first voltage limit switch 109 off.

The "off" time begins after the above-described transition is completed. At the end of the transition, the auxiliary switch 103 is closed and the dotted terminals of all the windings become negative. Current flows into the dotted terminal of the secondary winding 111 and the gate of the first synchronous rectifier switch 105 is at a positive potential with respect to secondary ground. With the gate of the first synchronous rectifier switch 105 at a positive potential, the channel of the first synchronous rectifier 105 is conducting. At the same time, the channel of the first voltage limit switch 109 is non-conducting which limits the peak voltage across the gate of the first synchronous rectifier switch 105. Also, during this period, the gate of the second synchronous rectifier switch 106 is negative with respect to secondary ground and the channel of the second synchronous rectifier switch 106 is non-conducting.

The "off" portion of the cycle ends when the auxiliary switch 103 opens and, after a short dead time, the power switch 101 closes. During this transitional period, the following occurs: (a) the polarity of all the windings are reversed, making the dotted terminal of all the windings positive, (b) as the un-dotted terminal of the drive winding 110 becomes negative, the body diode of the n-channel FET, i.e., the first voltage limit switch 109, becomes forward biased and begins to conduct, removing charge from the gate of the first synchronous rectifier switch 105 and turning the channel of the first synchronous rectifier 105 off and (c) current flows into the gate of the second synchronous rectifier switch 106 through the channel of the second voltage limit switch 108 until the channel of the second synchronous rectifier switch 106 is made conducting. Charge continues to flow through the channel of second voltage limit switch 108 until the voltage at the gate of the second synchronous rectifier switch 106 (which is also the source of the second voltage limit switch 108) is sufficiently positive with respect to the voltage source Vs to turn the channel of the second voltage limit switch 108 off.

Figure 2:
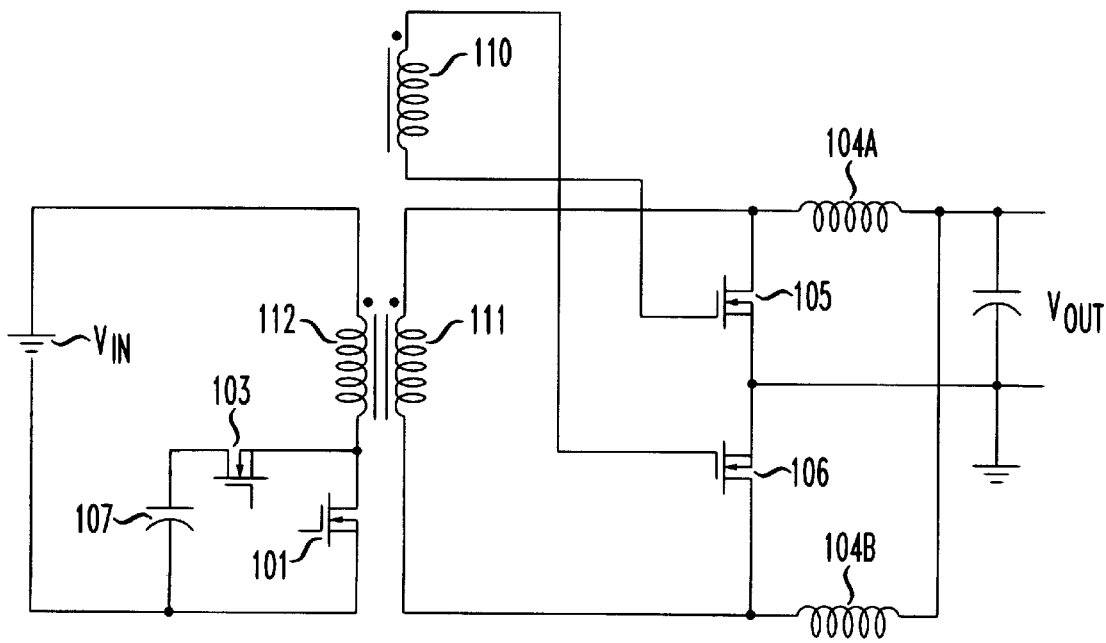
FIG. 2 illustrates a schematic diagram of another embodiment of a power converter with a self-synchronized synchronous rectifier constructed according to the principles of the present invention.

Turning now to FIG. 2, illustrated is a schematic diagram of another embodiment of a power converter with a self-synchronized synchronous rectifier constructed according to the principles of the present invention. The converter of FIG. 2 is analogous to the converter of FIG. 1 without employing the gate voltage limiting networks. The operation of the converter is also analogous to that of the converter of FIG. 1 and, as such, will not hereinafter be described.

Figure 3:
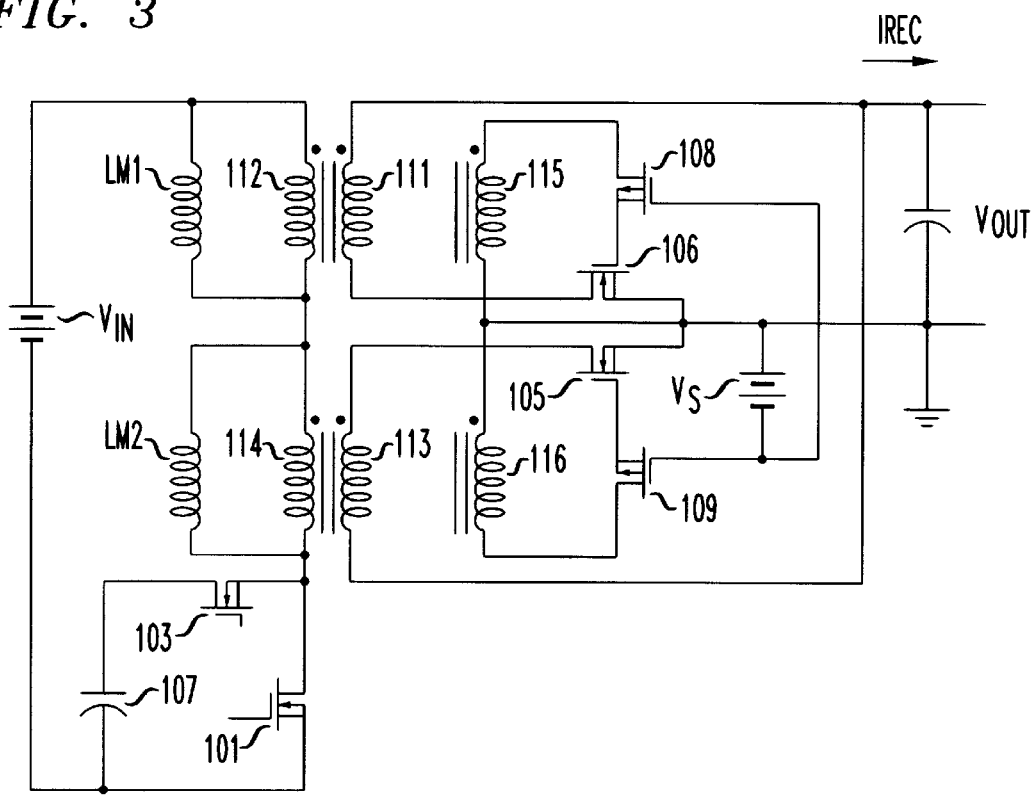
FIG. 3 illustrates a schematic diagram of another embodiment of a power converter with a self-synchronized synchronous rectifier constructed according to the principles of the present invention.

Turning now to FIG. 3, illustrated is a schematic diagram of another embodiment of a power converter with a self-synchronized synchronous rectifier constructed according to the principles of the present invention. The converter of FIG. 3 illustrates an extension of the principles presented U.S. Pat. No. 5,590,032 to Bowman, et al., including the two transformer clamped-mode converter disclosed therein. The advantages of this circuit is that the magnitude of the gate drive voltage applied to synchronous rectifier switches (e.g., FETs) 105, 106 during their respective "on" times is independent of duty cycle and is determined only by the magnitude of the output voltage transformed by the turns ratio of the secondary and drive windings 111, 115 for the first power transformer (for the synchronous rectifier switch 106) and by the turns ratio of the secondary and drive windings 113, 116 for the second power transformer (for the synchronous rectifier switch 105). The magnitude of this voltage can be independently set by selecting the appropriate number of turns for the drive windings 115, 116. This circuit is particularly well suited for low voltage, high current applications that use synchronous rectification.

A version of this circuit topology employing diode rectification has been proposed by U.S. Pat. No. 5,291,382, entitled "Pulse Width Modulated DC/DC Converter with Reduced Ripple Current Component Stress and Zero Voltage Switching Capability," to I. Cohen, issued Mar. 1, 1994, which is incorporated herein by reference.

The operation of the converter will hereinafter be described in detail. At the start of the "on" time, the power switch 101 is closed and the dotted terminal of all windings are positive. The rectified current flows out of the dotted terminal of the secondary winding 111. The gate of the synchronous rectifier switch 106 is at a positive potential with respect to secondary ground and the channel of synchronous rectifier switch 106 is conducting. The output voltage is imposed across the secondary winding 111 and thus appears (transformed) across the primary and drive windings 112, 115. The gate to source voltage across the synchronous rectifier switch 106 during the portion of the period when the synchronous rectifier switch 106 conducts is thus the transformed output voltage, independent of line voltage (and hence the duty cycle). The channel of the voltage limit switch (e.g., a p-channel FET) 108 is conducting. The gate of the synchronous rectifier switch 105 is negative with respect to secondary ground and the channel of synchronous rectifier switch 105 is non-conducting. The channel of the voltage limit switch 109 is non-conducting, limiting the magnitude of the negative voltage on the gate of synchronous rectifier switch 105.

The "on" portion of the cycle ends when power switch 101 opens and, after a short dead time, the auxiliary switch 103 closes. During this transition the following occurs: (a) the polarity of all windings are reversed, making the dotted terminal of all windings negative, (b) as the un-dotted terminal of the drive winding 116 becomes positive, the body diode of voltage limit switch 109 is forward biased and starts to conduct, conducting charge to the gate of the synchronous rectifier switch 105 and turning the channel of the synchronous rectifier switch 105 on, (c) current flows out of the gate of the synchronous rectifier switch 106 through the channel of the voltage limit switch 108 until the channel of the synchronous rectifier switch 106 is made non-conducting. Charge continues to flow through the channel of the voltage limit switch 108 until the voltage at the gate of the synchronous rectifier switch 106 (which is also the source of the voltage limit switch 108) is sufficiently negative with respect to the voltage source Vs to turn the channel of the voltage limit switch 108 off.

The "off" time starts after this transition is completed. The auxiliary switch 103 is closed and the un-dotted terminals of all windings are positive. The rectified current flows into the dotted terminal of the secondary winding 113, and is reflected to the primary winding 114. The gate of the synchronous rectifier switch 105 is at a positive potential with respect to secondary ground and the channel of the synchronous rectifier switch 105 is conducting. The output voltage is imposed across the secondary winding 113 and thus appears (transformed) across the primary and drive windings 114, 116. The gate to source voltage across the synchronous rectifier switch 105 during the portion of the period when the synchronous rectifier switch 105 conducts is thus the transformed output voltage, independent of line voltage (and hence the duty cycle). The channel of the voltage limit switch 109 is on. The gate of the synchronous rectifier switch 106 is negative with respect to secondary ground and the channel of the synchronous rectifier switch 106 is non-conducting. The channel of the voltage limit switch 108 is non-conducting, limiting the magnitude of the negative voltage on the gate of the synchronous rectifier switch 106.

The "off" portion of the cycle ends when the auxiliary switch 103 opens and, after a short dead time, the power switch 101 closes. During this transition the following occurs: (a) the polarity of all windings are reversed, making the dotted terminal of all windings positive, (b) as the dotted terminal of the drive winding 115 becomes positive, the body diode of the voltage limit switch 108 is forward biased and starts to conduct, conducting charge to the gate of the synchronous rectifier switch 106 and turning the channel of the synchronous rectifier switch 106 on, (c) current flows out of the gate of the synchronous rectifier switch 105 through the channel of the voltage limit switch 109 until the channel of the synchronous rectifier switch 105 is made non-conducting. Charge continues to flow through the channel of the voltage limit switch 109 until the voltage at the gate of the synchronous rectifier switch 105 (which is also the source of the voltage limit switch 109) is sufficiently negative with respect to the voltage source Vs to turn the channel of the voltage limit switch 109 off.

Figure 4:
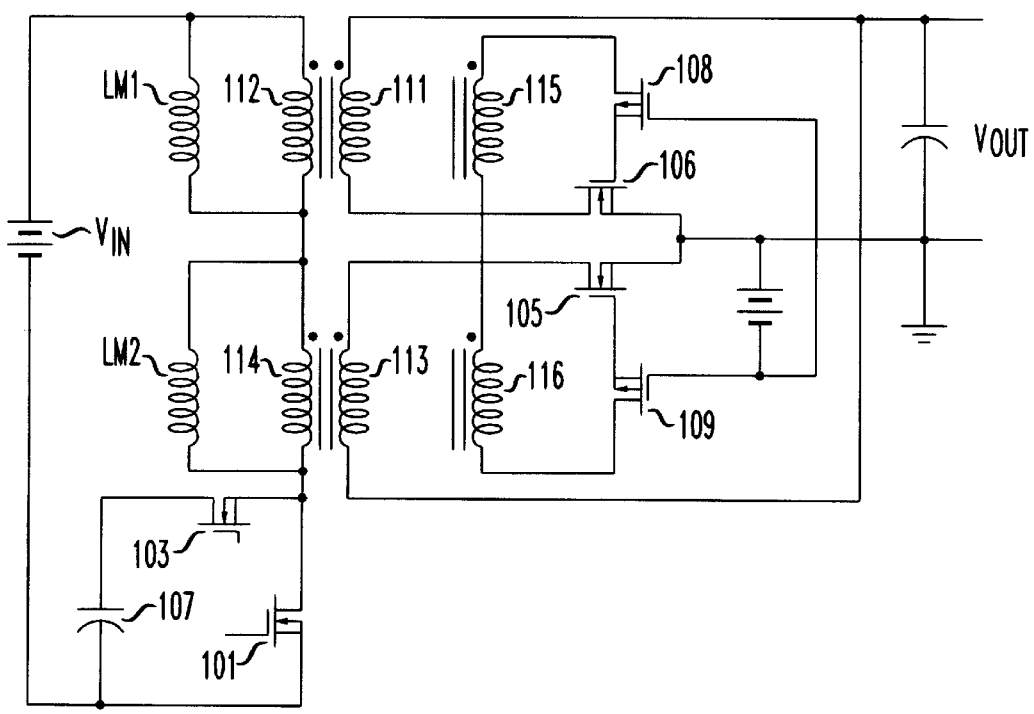
FIG. 4 illustrates a schematic diagram of another embodiment of a power converter with a self-synchronized synchronous rectifier constructed according to the principles of the present invention.

Turning now to FIG. 4, illustrated is a schematic diagram of another embodiment of a power converter with a self-synchronized synchronous rectifier constructed according to the principles of the present invention. The converter of FIG. 4 is analogous to the converter of FIG. 3 described above except that the drive windings 115, 116 for the synchronous rectifier switches 105, 106, respectively, are not connected to ground. The operation of the converter is analogous to that of the converter of FIG. 3 and, as such, will not hereinafter be described in detail.

Figure 5:
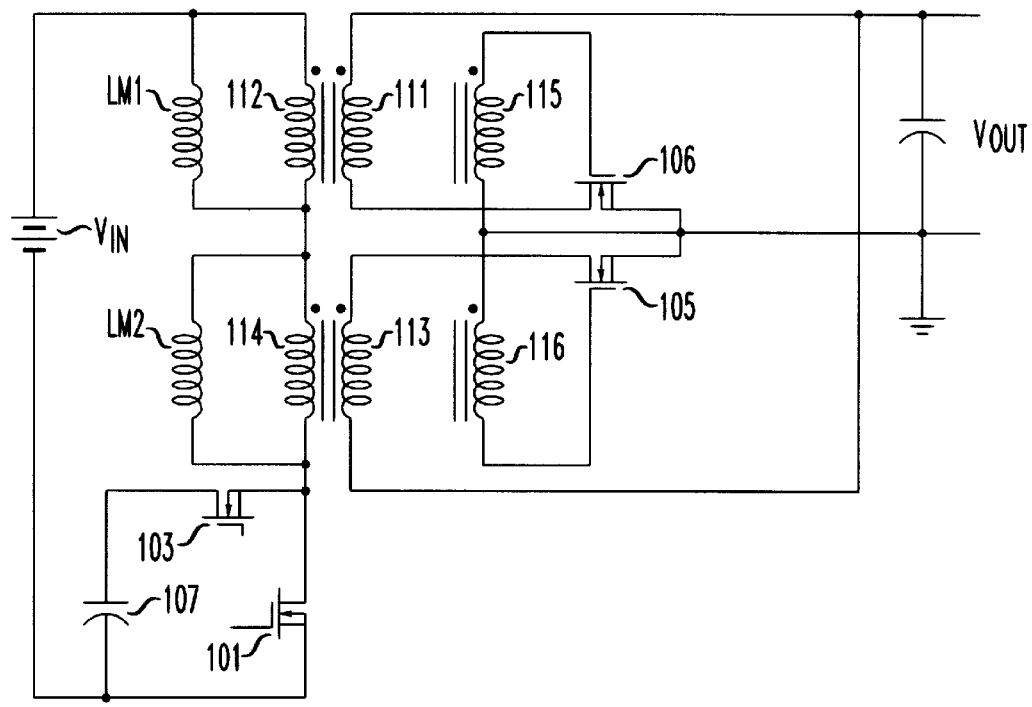
FIG. 5 illustrates a schematic diagram of another embodiment of a power converter with a self-synchronized synchronous rectifier constructed according to the principles of the present invention.

Turning now to FIG. 5, illustrated is a schematic diagram of another embodiment of a power converter with a self-synchronized synchronous rectifier constructed according to the principles of the present invention. The converter of FIG. 5 is analogous to the converter of FIG. 3 described above except that the converter does not employ voltage limit switches coupled to the synchronous rectifier switches 105, 106. Again, the voltage limit switches in the embodiment of FIG. 3 are p-channel FETs that limit the magnitude of the negative voltage applied to the gates of the synchronous rectifier switches 105, 106 during the nonconduction portions of the cycle. The operation of the converter is analogous to that of the converter of FIG. 3 and, as such, will not hereinafter be described in detail.

Figure 6:
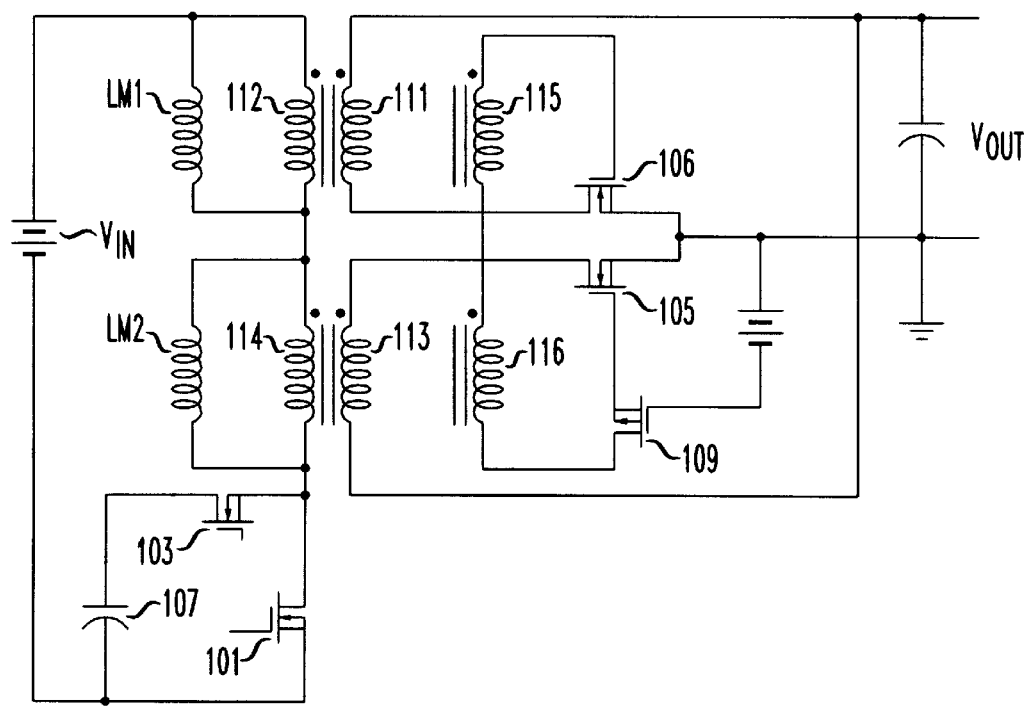
FIG. 6 illustrates a schematic diagram of another embodiment of a power converter with a self-synchronized synchronous rectifier constructed according to the principles of the present invention.

Turning now to FIG. 6, illustrated is a schematic diagram of another embodiment of a power converter with a self-synchronized synchronous rectifier constructed according to the principles of the present invention. The converter of FIG. 6 is analogous to the converter of FIG. 3 except that the converter employs a single voltage limit switch (namely, voltage limit switch 109) to limit a voltage applied to the gates of the synchronous rectifier switches 105, 106. The operation of the converter is analogous to that of the converter of FIG. 3 and, as such, will not hereinafter be described in detail.

Figure 7:
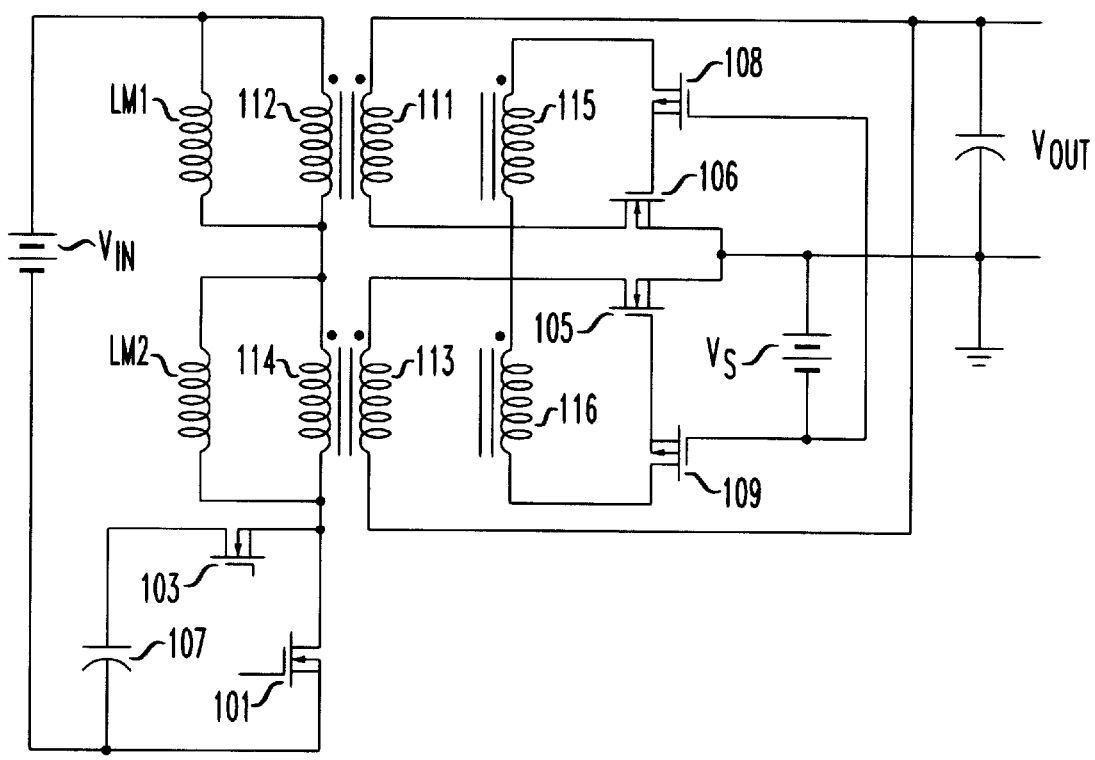
FIG. 7 illustrates a schematic diagram of another embodiment of a power converter with a self-synchronized synchronous rectifier constructed according to the principles of the present invention.

Turning now to FIG. 7, illustrated is a schematic diagram of another embodiment of a power converter with a self-synchronized synchronous rectifier constructed according to the principles of the present invention. The converter of FIG. 7 is analogous to the converter of FIG. 3 except that the converter employs n-channel FETs as the voltage limit switches 108, 109 to limit a voltage applied to the gates of the synchronous rectifier switches 105, 106. The operation of the converter is analogous to that of the converter of FIG. 3 and, as such, will not hereinafter be described in detail.

Figure 8:
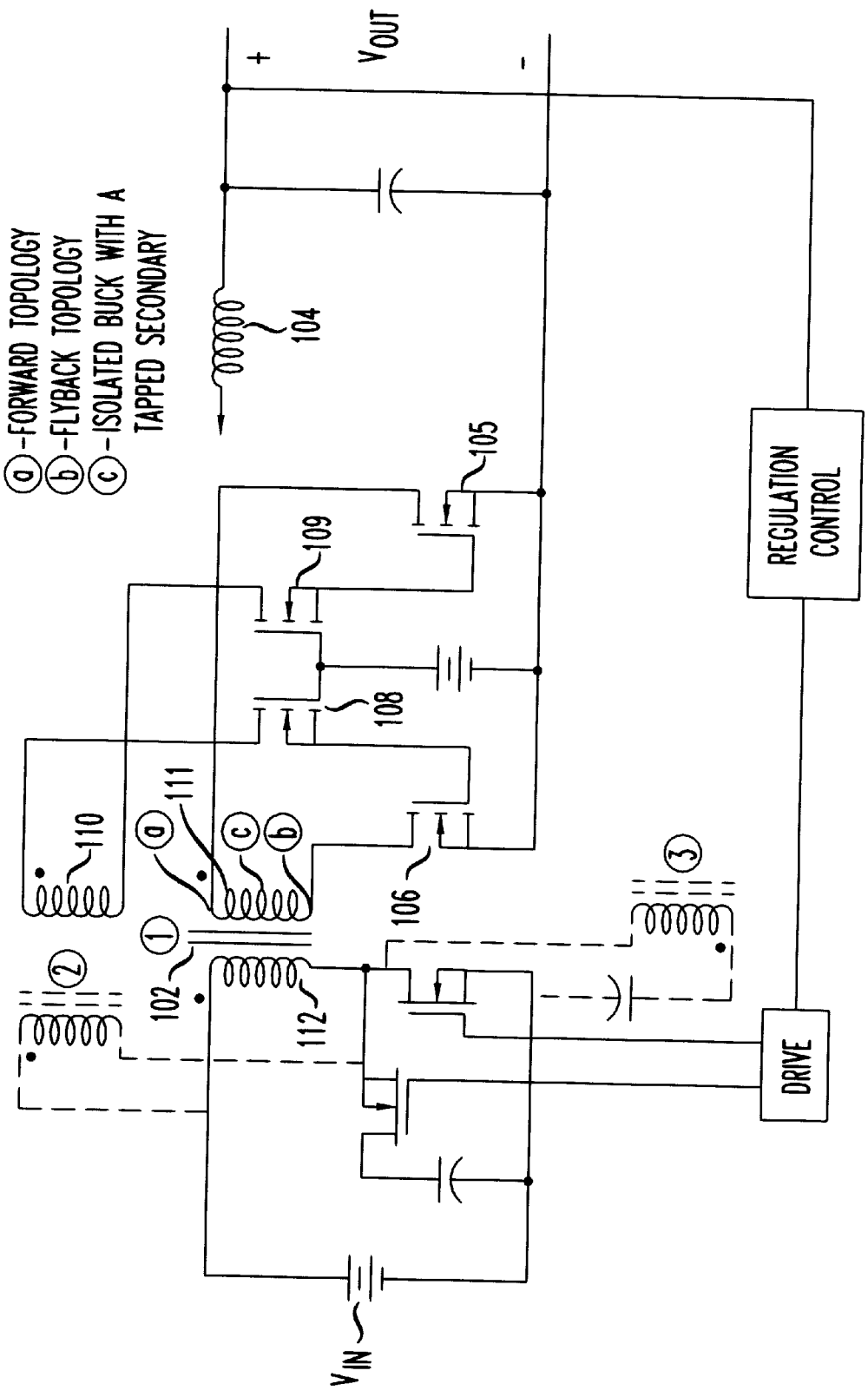
FIG. 8 illustrates a schematic diagram of various circuit topologies and locations for the positioning of a drive winding for a self-synchronized synchronous rectifier constructed according to the principles of the present invention.

Turning now to FIG. 8, illustrated is a schematic diagram of various circuit topologies and locations for the positioning of a drive winding for a self-synchronized synchronous rectifier constructed according to the principles of the present invention.

Figure 9:
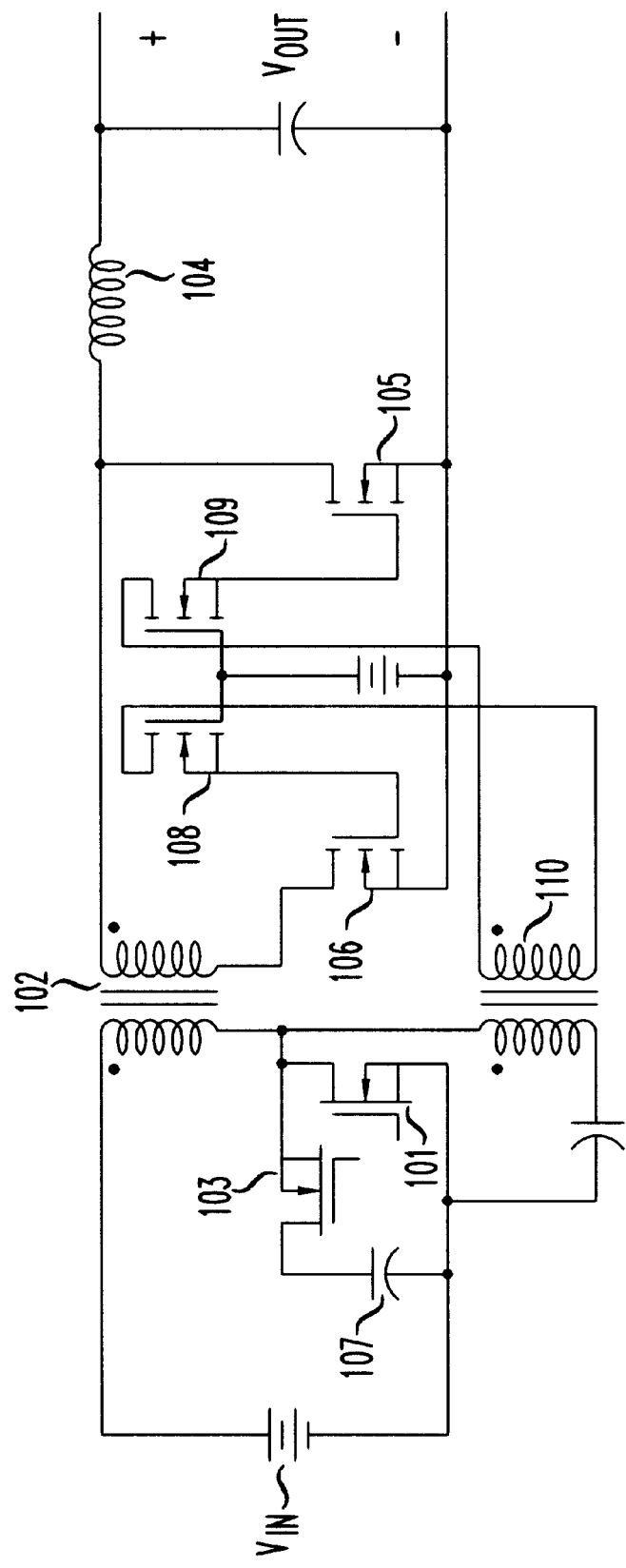
FIG. 9 illustrates a schematic diagram of another power converter having a drive winding for a self-synchronized synchronous rectifier constructed according to the principles of the present invention.

Turning now to FIG. 9, illustrated is a schematic diagram of another power converter having a drive winding for a self-synchronized synchronous rectifier constructed according to the principles of the present invention. In the illustrated embodiment, the drive winding is wound on a separate transformer other than a power transformer.

Figure 10:
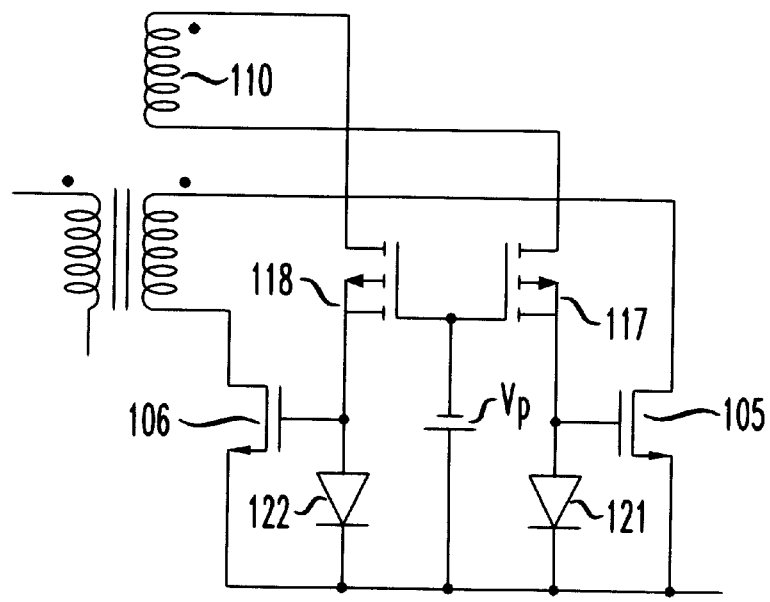
FIGS. 10–12 illustrate schematic diagrams of various embodiments of self-synchronized synchronous rectifiers constructed according to the principles of the present invention.
Figure 11:
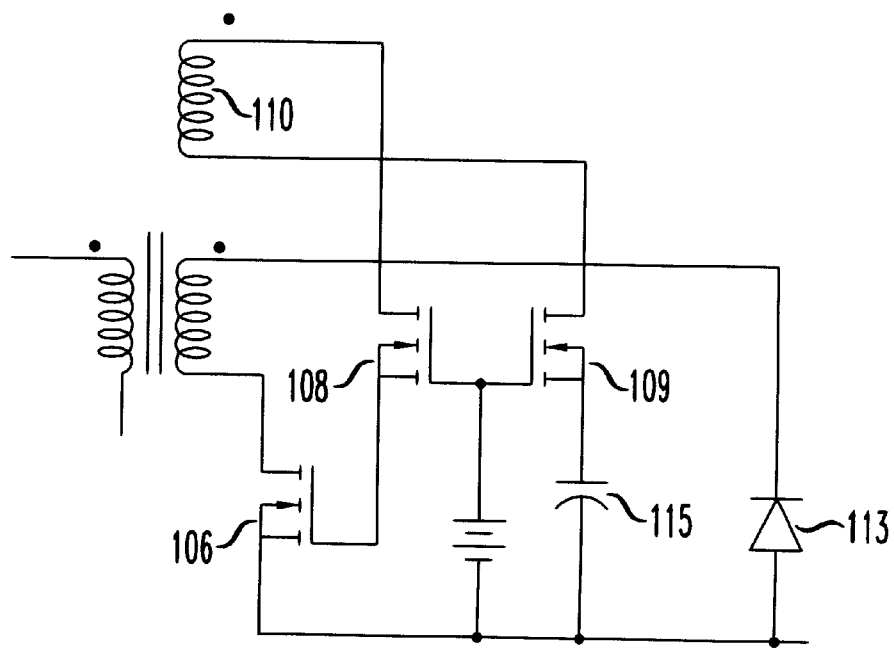
Figure 12:
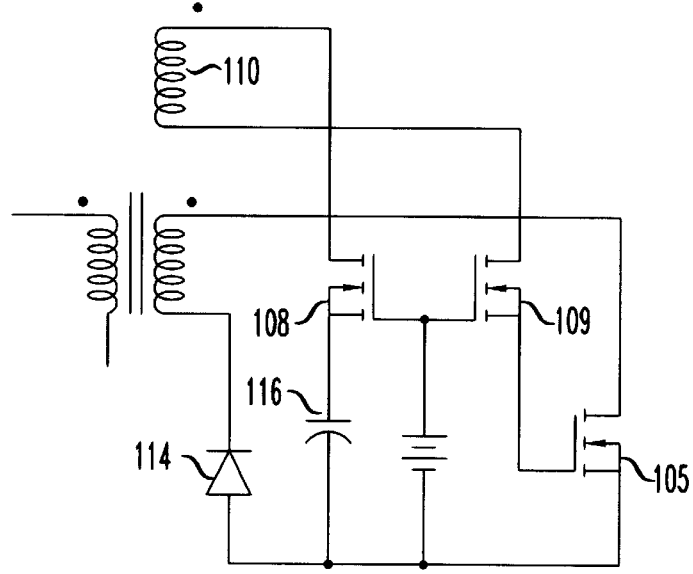

Turning now to FIGS. 10–12, illustrated are schematic diagrams of various embodiments of self-synchronized synchronous rectifiers constructed according to the principles of the present invention. In the illustrated embodiments, the self-driven synchronous rectifiers employ different types of synchronous rectifier switches.

Figure 13:
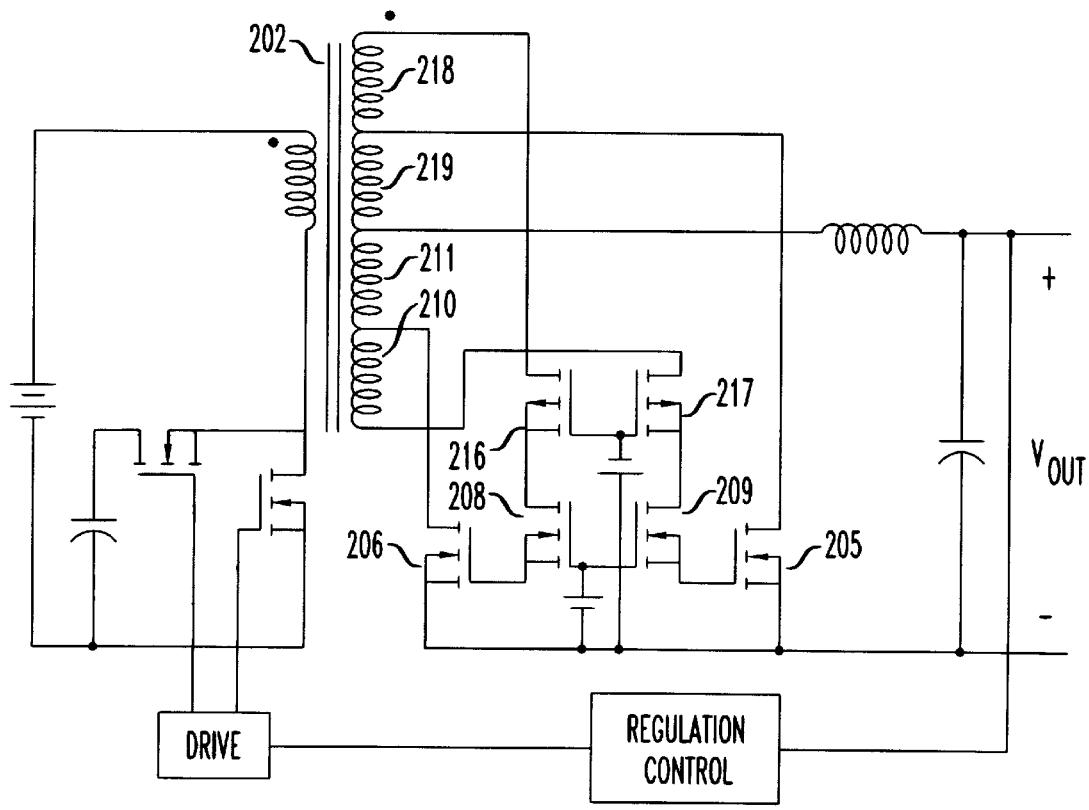
FIG. 13 illustrates a schematic diagram of another embodiment of a power converter employing a self-synchronized synchronous rectifier constructed according to the principles of the present invention.

Turning now to FIG. 13, illustrated is a schematic diagram of another embodiment of a power converter employing a self-synchronized synchronous rectifier constructed according to the principles of the present invention. In the illustrated embodiment, the power converter employs multiple drive windings to drive the synchronous rectifier switches.

The converters and self-synchronized synchronous rectifiers illustrated in FIGS. 8 through 13 are described in Bowman, et al. (previously incorporated by reference) and, therefore, will not hereinafter be described.

Although the present invention and its advantages have been described in detail, those skilled in the art should understand that they can make various changes, substitutions and alterations herein without departing from the spirit and scope of the invention in its broadest form.

What is claimed is:

1. A power converter having an input and output, comprising:

a power transformer having primary and secondary windings;

a power switch coupled to said input and configured to impress an input voltage across said primary winding;

a hybridge synchronous rectifier including first and second synchronous rectifier switches series-coupled across said secondary winding and first and second inductors respectively coupled to said first and second synchronous rectifier switches, an output of said hybridge synchronous rectifier available at a node between said first and second inductors; and a separate drive winding wound on said power transformer and coupled between said first and second synchronous rectifier switches, said separate drive winding configured to alternately energize said first and second synchronous rectifier switches.

2. The power converter as recited in claim 1 further comprising a low pass filter coupled between said secondary winding and said output.

3. The power converter as recited in claim 1 further comprising first and second voltage limit switches that limit a voltage level of a signal applied to said first and second synchronous rectifier switches, respectively.

4. The power converter as recited in claim 3 wherein said first and second voltage limit switches are metal-oxide semiconductor field-effect transistors (MOSFETs).

5. The power converter as recited in claim 3 further comprising a voltage source that supplies a bias voltage to said first and second voltage limit switches.

6. The power converter as recited in claim 1 further comprising a clamp circuit coupled to said power transformer.

7. The power converter as recited in claim 1 wherein at least one of said first and second synchronous rectifier switches is a diode.

8. The power converter as recited in claim 1 further comprising first and second diodes that limit a positive voltage of a signal applied to said first and second synchronous rectifier switches, respectively.

9. The power converter as recited in claim 1 further comprising first and second voltage limit switches and a voltage source that limit a negative voltage of a signal applied to said first and second synchronous rectifier switches, respectively.

10. The power converter as recited in claim 9 wherein said first and second voltage limit switches are metal-oxide semiconductor field-effect transistors (MOSFETs).

11. The power converter as recited in claim 1 further comprising a regulation control circuit and a drive circuit coupled between said output and said power switch.

12. The power converter as recited in claim 1 wherein said first and second synchronous rectifier switches are selected from the group consisting of:

a metal-oxide semiconductor field-effect transistor (MOSFET), a bipolar junction transistor (BJT), and a gallium arsenide field-effect transistor (GaAsFET).

13. A method of operating a power converter having an input and output, comprising:

providing a power transformer having primary and secondary windings;

impressing an input voltage across said primary winding with a power switch coupled to said input;

coupling a hybridge synchronous rectifier to said secondary winding, said hybridge synchronous rectifier including first and second synchronous rectifier switches series-coupled across said secondary winding and first and second inductors respectively coupled to said first and second synchronous rectifier switches, an output of said hybridge synchronous rectifier available at a node between said first and second inductors; and alternately energizing said first and second synchronous rectifier switches with a separate drive winding wound on said power transformer and coupled between said first and second synchronous rectifier switches.

14. The method as recited in claim 13 further comprising filtering a voltage at said output.

15. The method as recited in claim 13 further comprising limiting a voltage level of a signal applied to said first and second synchronous rectifier switches.

16. The method as recited in claim 15 wherein the act of limiting is performed by first and second voltage limit switches coupled to said first and second synchronous rectifier switches, respectively.

17. The method as recited in claim 16 further comprising supplying a bias voltage to said first and second voltage limit switches.

18. The method as recited in claim 13 further comprising clamping a voltage across said power transformer during a nonconduction interval of said power switch.

19. The method as recited in claim 13 wherein at least one of said first and second synchronous rectifier switches is a diode.

20. The method as recited in claim 13 further comprising controlling an operation of said power switch.

21. A power converter having an input and output, comprising:

a first and second power transformer each having primary and secondary windings;

a power switch, coupled to said input, that impresses an input voltage across said primary windings;

a synchronous rectifier coupled to said secondary windings and including first and second synchronous rectifier switches; and first and second drive windings, separate from said secondary windings, wound on said first and second power transformers, respectively, and coupled to said first and second synchronous rectifier switches, respectively, said first and second drive windings configured to alternately energize said first and second synchronous rectifier switches, respectively.

22. The power converter as recited in claim 21 further comprising a filter coupled between said secondary windings and said output.

23. The power converter as recited in claim 21 further comprising first and second voltage limit switches that limit a voltage level of a signal applied to said first and second synchronous rectifier switches, respectively.

24. The power converter as recited in claim 23 wherein said first and second voltage limit switches are metal-oxide semiconductor field-effect transistors (MOSFETs).

25. The power converter as recited in claim 23 further comprising a voltage source that supplies a bias voltage to said first and second voltage limit switches.

26. The power converter as recited in claim 21 further comprising a clamp circuit coupled to said first and second power transformers.

27. The power converter as recited in claim 21 wherein at least one of said first and second synchronous rectifier switches is a diode.

28. The power converter as recited in claim 21 further comprising first and second diodes that limit a positive voltage of a signal applied to said first and second synchronous rectifier switches, respectively.

29. The power converter as recited in claim 21 further comprising first and second voltage limit switches and a voltage source that limit a negative voltage of a signal applied to said first and second synchronous rectifier switches, respectively.

30. The power converter as recited in claim 29 wherein said first and second voltage limit switches are metal-oxide semiconductor field-effect transistors (MOSFETs).

31. The power converter as recited in claim 21 further comprising a regulation control circuit and a drive circuit coupled between said output and said power switch.

32. The power converter as recited in claim 21 wherein said first and second synchronous rectifier switches are selected from the group consisting of:
   a metal-oxide semiconductor field-effect transistor (MOSFET),
   a bipolar junction transistor (BJT), and
   a gallium arsenide field-effect transistor (GaAsFET).

33. A method of operating a power converter having an input and output, comprising:
   providing a first and second power transformer each having primary and secondary windings;
   impressing an input voltage across said primary windings with a power switch coupled to said input;
   coupling a synchronous rectifier to said secondary windings and including first and second synchronous rectifier switches; and
   alternately energizing said first and second synchronous rectifier switches with first and second drive windings separate from said secondary windings and wound on said first and second power transformers, respectively.

34. The method as recited in claim 33 further comprising filtering a voltage at said output.

35. The method as recited in claim 33 further comprising limiting a voltage level of a signal applied to said first and second synchronous rectifier switches.

36. The method as recited in claim 35 wherein the act of limiting is performed by first and second voltage limit switches coupled to said first and second synchronous rectifier switches, respectively.

37. The method as recited in claim 36 further comprising supplying a bias voltage to said first and second voltage limit switches.

38. The method as recited in claim 33 further comprising clamp a voltage across said power transformer during a nonconduction interval of said power switch.

39. The method as recited in claim 33 wherein at least one of said first and second synchronous rectifier switches is a diode.

40. The method as recited in claim 33 further comprising controlling an operation of said power switch.

* * * * *